Sept. 14, 1948.  P. M. VAN ALPHEN  2,449,345
SCHMIDT TYPE OPTICAL SYSTEM WITH OPAQUE DIAPHRAGM
Filed April 18, 1946
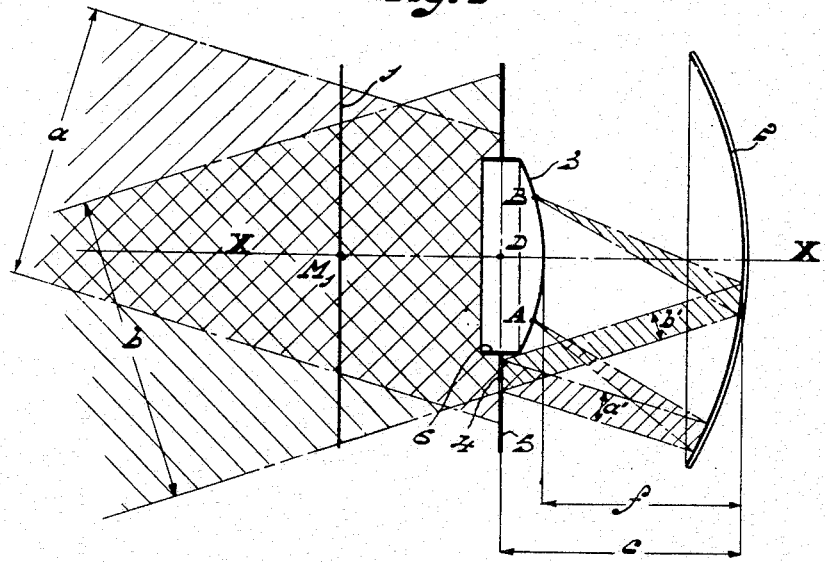
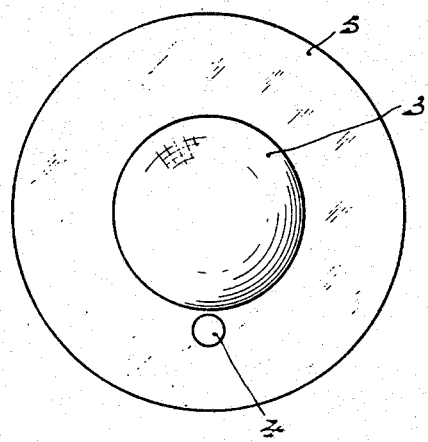
INVENTOR
PIETER MARTINUS VAN ALPHEN
BY Lee B. Kemon
ATTORNEY Patented Sept. 14, 1948

2,449,345

UNITED STATES PATENT OFFICE 2,449,345

SCHMIDT TYPE OPTICAL SYSTEM WITH OPAQUE DIAPHRAGM

Pieter Martinus van Alphen, Eindhoven, Netherlands, assignor, by mesne assignments, to Hartford National Bank and Trust Company, Hartford, Conn., as trustee Application April 18, 1946, Serial No. 663,142
In the Netherlands July 12, 1941

Section 1, Public Law 690, August 8, 1946
Patent expires July 12, 1961

4 Claims. (Cl. 88—57)

The optical system of Schmidt, also called Schmidt-camera as described in "Lunettes et Télescopes" by Danjon et Coudert 1935, pages 252 to 254, comprises as chief elements the spherical receiving mirror, the projection surface and the correcting element. The correcting element has mainly for its purpose to suppress at least approximately the spherical aberration of the spherical receiving mirror. Such a system has the advantage that a very large aperture ratio can be attained. In definite cases, however, it will be desirable in using this system to reduce this aperture ratio which, similarly to other cameras, can be reduced by means of a diaphragm. The invention purports to procure that position of the diaphragm in a Schmidt-camera which generally yields the best results.

According to the invention the device in such a system, for stopping the beam of light received by the system, is positioned in such manner that the projection of this device on the axis of the system is at a distance from the receiving mirror which amounts at least to 0.75 and at the utmost to 1.75 times the focal distance of the receiving mirror. As a result of this positioning the diaphragm lies in the vicinity of the projection surface, owing to which the projection surface and also the image holder, if available, intercept as small a quantity as possible of the light received by the camera so that annoying shadows are substantially absent in the received image. These annoying shadows might be avoided by placing the diaphragm on the correcting plate or on the receiving mirror by giving these elements very large cross-dimensions, it is true, but this is generally not desirable; moreover, the drawback of light striking the projection surface at very large angles is experienced in this case. In accordance with the shape of the projecting surface (and also of the image holder as the case may be) the diaphragm will be positioned in the camera within the limits stated above. If, for instance, the image holder has fairly considerable dimensions in an axial direction then, in view of the fact that the image holder is located between the projection surface and the correcting element, the projection of the diaphragm on the axis of the system will also lie between the projection surface and the correcting element. If, in contradistinction thereto the projection surface is surrounded by a former-shaped screen extending in the direction of the receiving mirror, the position of the diaphragm will generally be so chosen that its projection on the axis of the system lies between the projection surface and the receiving mirror. It will always be possible to indicate a position of the diaphragm within the said limits which is most advantageous in a definite case. Besides it is desirable that the distance between the diaphragm and the axis of the system should be as small as possible. If, for instance, the image holder (if desired the projection surface) has a rectangular cross-section, the diaphragm may be best provided adjacent the longer side of this holder. In general it can be said that a position of the diaphragm adjacent the projection surface is to be preferred.

Fig. 1 represents schematically a Schmidt camera including a diaphragm according to the invention; and Fig. 2 represents a front elevation of the opaque plate of the diaphragm for the projection surface.

Fig. 1 represents schematically a Schmidt-camera comprising the diaphragm according to the invention. The correcting element which actually has an aspherical surface as a rule, but for the sake of simplicity is indicated by a straight line in the drawing, is designated by 1, the reference number 2 designating the receiving mirror which exhibits a spherical surface and has its centre $M_1$ in the point of intersection of the system axis X—X and the correcting element 1. The reference number 3 designates the projection surface which is also spherical and also has its center of curvature at $M_1$. The diaphragm is constituted by a circular aperture 4 in an opaque plate 5 located in the vicinity of the projection surface 3 in such manner that its projection D on the system axis X—X lies between the correcting element 1 and the projection surface 3. In the present case the distance c between the receiving mirror 2 and the projection D of the diaphragm 4 amounts to 1.18 times the focal distance $f$ of the receiving mirror 2.

The indicated position of the diaphragm has been chosen, since the holder 6 carrying the projection surface 3 has dimensions in the direction of the axis X—X which cannot be ignored. In the present case where the holder 6 is imagined as a cylinder the best results are obtained by placing the diaphragm 4 about halfway the length of the holder 6. This figure shows two light beams originating from the extreme points of the objects located at an infinite distance. Of the beam a originating from the said extreme part of this object solely the portion a', which forms a picture point on the projection surface 3 at A, passes through the diaphragm 4. In an analogous manner the beam of light b originating from the lower extreme point of the object to be recorded is reduced by the diaphragm to a narrow beam b' forming a picture point B on the projection surface 3. From the drawing it appears that on the projection surface 3 no shadows are formed by the presence of the diaphragm, which would be the case if the diaphragm were provided either on or in the proximity of the correcting element 1 of the mirror 2.

Fig. 2 illustrates in front elevation the position of the projection surface 3 and of the screen 5 which comprises the diaphragm 4 located at the side of the projection surface 3.

What I claim is:

1. A Schmidt type optical system comprising a concave mirror, a correction element, an element interposed between said mirror and said correction element and having a surface substantially coincident with the focal surface of said system, and an opaque diaphragm having an aperture for the transmission of light therethrough and mounted at a distance along the optical axis from said mirror between three-fourths and one and three-fourths times the focal distance of said mirror and interposed between said correcting element and said mirror.

2. A Schmidt type optical system comprising a concave mirror, a correction element, an element interposed between said mirror and said correcting element and having a surface substantially coincident with the conjugate focal surface of said system closest to said mirror, and an opaque diaphragm having an aperture for the transmission of light therethrough and mounted at a distance along the optical axis in the immediate vicinity of said surface.

3. A Schmidt type optical system comprising a concave mirror, a correction element, an opaque element interposed between said mirror and said correction element and having a surface facing said mirror, said surface being substantially coincident with the focal surface of said system, and an opaque diaphragm around said surface and having an aperture for the transmission of light therethrough from said correction element to said mirror.

4. A Schmidt type optical system comprising a concave mirror, a correction element, an opaque element interposed between said mirror and said correction element and having a surface facing said mirror, said surface being substantially coincident with the focal surface of said system, and an opaque diaphragm around said surface and having an off-axis aperture for the transmission of light therethrough from said correction element to said mirror.

PIETER MARTINUS van ALPHEN.

REFERENCES CITED

The following references are of record in the file of this patent:

UNITED STATES PATENTS

| Number | Name | Date |
|---|---|---|
| 2,170,979 | Straubel | Aug. 29, 1939 |
| 2,273,801 | Landis | Feb. 17, 1942 |
| 2,298,808 | Ramberg | Oct. 13, 1942 |
| 2,295,779 | Epstein | Sept. 15, 1942 |

FOREIGN PATENTS

| Number | Country | Date |
|---|---|---|
| 554,024 | Great Britain | June 16, 1943 |